Patented Nov. 18, 1924.

1,515,912

UNITED STATES PATENT OFFICE.

WILLIAM MICOU TURNLEY, OF TORONTO, ONTARIO, CANADA.

DRY CELL.

No Drawing.   Application filed May 7, 1924.   Serial No. 711,739.

*To all whom it may concern:*

Be it known that I, WILLIAM MICOU TURNLEY, a citizen of the United States of America, and resident of the city of Toronto, county of York, Province of Ontario, in the Dominion of Canada, have invented certain new and useful Improvements in Dry Cells, as described in the following specification.

The present invention relates to galvanic cells and more particularly to dry cells of the Le Clanché type.

Dry cells now manufactured for ignition, telephone, flashlight and radio use consist in general of a zinc electrode which forms the container for the cell, a carbon electrode surrounded by a depolarizing mixture of ground carbon and manganese dioxide, and an electrolyte or exciting material usually consisting of a solution of ammonium and zinc chlorides. In one form of dry cell the electrolyte is partially contained in the depolarizing mix which may be wrapped in a muslin sheath, and partially mixed with starch or farinaceous material in the form of a paste inserted between the depolarizing mix and the zinc electrode.

In another common type of dry cell the electrolyte is partially carried by a bibulous lining of paper or pulp board and partially contained by the depolarizing mix which is tightly tamped between the lining and the carbon electrode by well known methods.

In both types of dry cells the contents of the zinc can is closed and protected from evaporation by pouring a molten pitch or resinous seal into the top of the can when it hardens upon cooling.

The objects of this invention are to increase the efficiency and discharge capacity of such cells and more particularly to improve them in such a way as to obtain a higher voltage, a larger current output and longer shelf life.

The principal feature of the invention consists in the use of chloride of aluminum in the electrolyte or exciting material in part or complete substitution for the zinc chloride or ammonium chloride.

The aluminum chloride may be introduced into the cell in the place of the zinc chloride usually contained in the paste or lining of the cell, or it may take the place of the ammonium chloride constituent of the depolarizing mix depending upon the particular use to which the cell is to be put.

I do not wish to confine myself to the proportion of aluminum chloride to be used or its location in the cell, as I have found that these may be varied over wide limits in the production of beneficial results. Neither do I wish to be confined to the use of aluminum chloride in any particular types of dry cells, as I have found it to be beneficial in all variations of the bag and paper lined types of cells.

The most noticeable effect which the introduction of aluminum chloride has on the performance of dry cells is the heightened voltage which is imparted. The normal open circuit voltage of dry cells containing the usual ingredients is from 1.50 to 1.65 while those in which aluminum chloride has been used show an open circuit voltage of from 1.80 to 1.85 and when the cells are put on discharge the voltage drops more slowly, which results in a greater amount of useful service being obtained from them. Also the shelf life of aluminum chloride dry cells is considerably longer than those in which it is not used.

What I claim as my invention is:—

1. A dry cell having an electrolyte containing aluminum chloride as one of its principal ingredients.

2. In a dry cell, the combination with the container, a carbonaceous electrode supported therein and a depolarizing body surrounding the electrode, of an electrolyte containing aluminum chloride.

3. In a dry cell, the combination with a zinc container, a carbon electrode supported therein and a foraminous depolarizing body surrounding the carbon electrode, of an electrolyte containing aluminum chloride.

WILLIAM MICOU TURNLEY.